Dec. 30, 1969 W. BOURNE 3,486,201
CABLE AND LIKE BINDING CLIPS
Filed Aug. 5, 1968
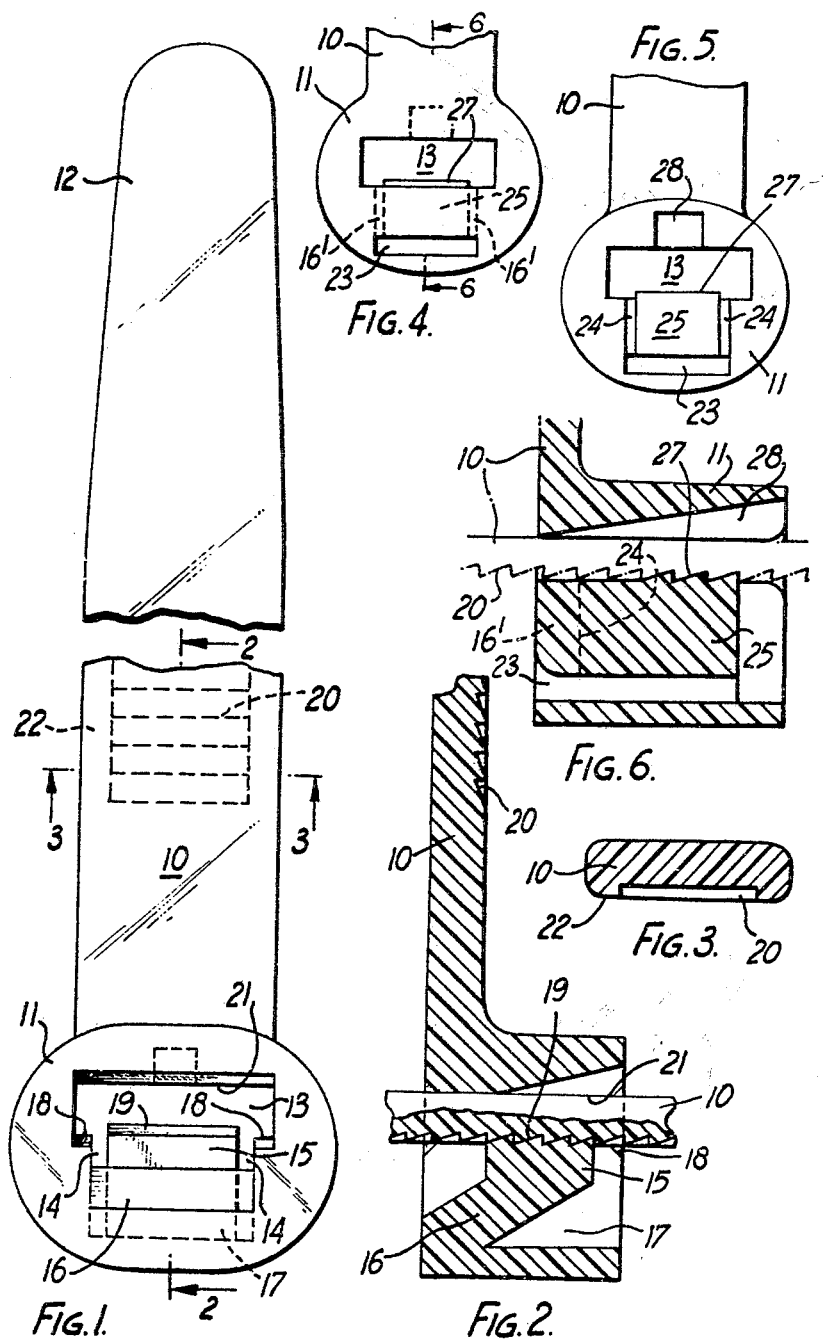

United States Patent Office 3,486,201
Patented Dec. 30, 1969

3,486,201
CABLE AND LIKE BINDING CLIPS
Walter Bourne, Hazel Grove, Stockport,
Cheshire, England
Filed Aug. 5, 1968, Ser. No. 750,301
Int. Cl. A44b 19/16
U.S. Cl. 24—16                                    5 Claims

ABSTRACT OF THE DISCLOSURE

A binding clip for cables and the like comprising an elongated flexible tongue, a comparatively rigid head integral with one end of the tongue having an elongated eye therein, a pawl integrally flexibly joined to the head defining one side of the eye, the eye being a straight passage of uniform cross-section complementary to the tongue, ratchet teeth on the pawl projecting into the eye parallel to its major dimension, a row of complementary teeth medially of the tongue, the tongue being wider than the pawl whereby plain portions thereof which are on either side of the teeth abut rigid parts of the head ensuring effective interengagement of the two sets of teeth so that return movement of the tongue is resisted.

---

This invention relates to cable or like binding clips, of the type comprising an elongated flexible tongue moulded integrally with a relatively rigid head which has an eye therein and a pawl flexibly mounted so as to define one side of such eye, said pawl permitting passage of said tongue through said eye to tighten the clip around a bundle of cables or the equivalent, but cooperating with the opposite side of said eye to resist return movement of said tongue in a manner to slacken the clip.

With clips of the type referred to, it is known practice to round or bevel off that corner of the pawl which is innermost when the clip is in operative condition, and likewise to form the end of said pawl with a transverse ratchet tooth adapted to interengage selectively with a series of similar teeth on the coacting face of the tongue.

Even when such clips are formed of a tough plastics material such as nylon, the single pawl tooth aforesaid tends to be blunted by the riding of the tongue teeth past it and can no longer make effective engagement with such teeth when the clip is finally tightened.

It is a further drawback of such clips, as at present made, that the direction in which the free part of the tongue is necessarily pulled during tightening of the clip tends to separate the teeth thereof from the pawl tooth so that some slippage is liable to occur, through the inherent elasticity of the plastics material, when the tensioning force is relaxed.

Such slippage may be sufficient completely to release the clip if, as is often desirable, the excess length of tongue is cropped off flush with the outer face of the head, even when the normal position of the pawl tooth is somewhat inset with reference to such face.

According to this invention, whose object is to provide an improved construction which will avoid the above mentioned drawbacks of the known articles, a cable or like binding clip of the type referred to is characterised in that the eye is formed as a straight passage of a substantially constant cross-section complementary to that of the tongue and bounded at one side by rigid parts of the head adapted for engagement by plain marginal portions of said tongue and by an intervening face of the pawl bearing a series of ratchet teeth for engagement by similar teeth on said tongue.

Preferably the pawl is flexibly connected to the head at the side of the eye remote from the tongue.

For example, it may be reduced in thickness at its junction either with that end of the head which is outermost with reference to the tongue, or with each side of such head, the operative face of the pawl in either case being directed towards the tongue and forming one side of a slot whose major dimension is transverse to the latter.

In the accompanying drawings:

FIG. 1 is a fragmentary plan view of one form of the open clip, showing what will be its inner face in use;

FIG. 2 is a section on the line 2—2 of FIG. 1 showing the tongue engaged with the pawl;

FIG. 3 is an enlarged section on the line 3—3 of FIG. 1;

FIG. 4 is a view corresponding to FIG. 1 but showing a modified construction;

FIG. 5 is a fragmentary underside plan view of the clip shown in FIG. 4; and

FIG. 6 is an enlarged section on the line 6—6 of FIG. 4, showing the tongue engaged with the pawl.

In the example illustrated in FIGS. 1 to 3, the clip is mounted in a single operation from nylon and comprises an elongated flexible tongue 10 with a substantially thicker and relatively rigid head 11 at one end, the other extremity of the tongue being tapered in width and thickness to a blunt tip 12.

The head 11, which is wholly offset to one side of the tongue's thickness and may be oval in plan view, exhibits an eye 13 in the form of a through-slot situated adjacent its inner end and extending transversely of the length of the tongue 10. This eye 13 will snugly accommodate the full width of the tongue 10 when the latter is looped (for example, around a bundle of cables, ropes or tubes) and its tip 12 pushed through the head 11, but is somewhat narrower than the maximum thickness of such tongue.

From points somewhat inwards of opposite ends of the eye 13 through-slots 14 are formed at right angles thereto to leave a semi-detached pawl 15 whose neck portion 16 is rendered readily flexible by forming a V-groove 17 across its outer face.

The outer and inner faces of the pawl 15 are inset with reference to those of the head 11, the eye 13 forming a straight passage of substantially uniform cross-section which is bounded, at the side remote from the tongue 10, by the free end of the pawl 15 and flat rigid shoulders 18 flanking the latter.

A plurality of (say, four) ratchet teeth 19 are formed across the full width of the free end of the pawl 15 to cooperate with a series of complementary teeth 20 arranged medially of the outer face of the tongue 10.

At the inner face of the head 11 the lateral edges of the eye 13 are slightly bevelled, as at 21, to facilitate entry of the tip 12 of the tongue 10, which latter, when pulled through the eye to tighten the clip, is effectively guided by engagement of its plain inner face against the adjacent flat side 22 of the eye and by engagement of its plain marginal portions 23 against the opposing shoulders 18.

During passage of the thicker part of the tongue 10 through the eye 13, the flexible neck portion 16 of the pawl 15 allows the free end of the latter to yield whilst remaining substantially parallel to the opposite side 22 of the eye 13, so that a corresponding number of tongue teeth 20 ride simultaneously past the several teeth 19 on the pawl 15, which therefore locks the tongue 10 effectively when the clip is fully tightened, the form of the teeth 19, 20 ensuring that the tensile load on the tongue 10 will jam it against the side 22 of the eye 13.

It is highly desirable that the teeth 19, 20 be designed with slightly rounded edges, so that their effective interengagement can be hampered by moulding flash thereon.

In the alternative construction shown in FIGS. 4 to 6, a parallel, but shorter and narrower slot 23 is formed between the eye 13 and the outer end of the head 11 has deep grooves 24 in the outer face of the head 11 running at right angles to the length of this slot from opposite ends thereof to the adjacent side of the eye 13. The part of the head defined by the several slots and grooves forms the pawl 25 which is resiliently held by the necks 16' of material at opposite sides thereof, and which in this case has three transverse ratchet teeth 27 directed across the eye 13 to cooperate with the tongue teeth 20.

In each construction the insetting of the pawl with reference to the outer face of the head 11 enables the excess length of tongue 10 to be cropped off flush with the latter when the clip is fully tightened, without affecting the security of its engagement by the pawl teeth 20.

What I claim is:

1. A binding clip for cables and the like comprising an elongated flexible tongue, a relatively rigid head formed integrally with one end of said tongue and having an elongated eye therein, a pawl integrally and flexibly united to said head so as to define one side of said eye, said eye being formed as a straight passage of a substantially uniform cross-section complementary to that of said tongue, a series of ratchet teeth formed on said pawl so as to project into said eye in parallel relation to its major dimension, and a row of coacting teeth formed medially of said tongue, said tongue being wider than said pawl so that plain portions thereof flanking said row of teeth abut rigid parts of said head to ensure effective interengagement of the teeth on said pawl and said tongue in a manner to resist return movement of said tongue after the free end of the latter has been drawn through said eye to tighten the clip.

2. A binding clip as claimed in claim 1, wherein said pawl is connected to said head at the side of said eye remote from said tongue.

3. A binding clip as claimed in claim 1, and including a flexible neck whereby said pawl is connected to that end of said head which is outermost with reference to said tongue.

4. A binding clip as claimed in claim 1, and including two flexible necks whereby said pawl is connected to opposite sides of said head.

5. A binding clip as claimed in claim 1, wherein said pawl is inset with reference to those faces of said head between which said eye extends.

References Cited

UNITED STATES PATENTS

| | | |
|---|---|---|
| 3,127,648 | 4/1964 | Emery. |
| 3,339,246 | 9/1967 | Geisinger. |
| 3,368,247 | 2/1968 | Orban. |

DONALD A. GRIFFIN, Primary Examiner